United States Patent [19]
Kato et al.

[11] Patent Number: 4,711,872
[45] Date of Patent: Dec. 8, 1987

[54] CATALYST FOR COMBUSTION AND PROCESS FOR PRODUCING SAME

[75] Inventors: Yasuyoshi Kato; Nobue Teshima, both of Kure; Masao Ohta, Hiroshima; Kunihiko Konishi, Kure, all of Japan

[73] Assignee: Babcock-Hitachi Kabushiki Kaisha, Japan

[21] Appl. No.: 855,484

[22] Filed: Apr. 24, 1986

[30] Foreign Application Priority Data

Apr. 25, 1985 [JP] Japan ................................ 60-89196

[51] Int. Cl.$^4$ ........................ B01J 21/04; B01J 23/58
[52] U.S. Cl. ................................................ 502/328
[58] Field of Search ................................ 502/328, 341

[56] References Cited

U.S. PATENT DOCUMENTS 3,988,259 10/1976 Ray ................................ 502/53 X
4,461,919 7/1984 Kroenke et al. ................ 585/658 X

FOREIGN PATENT DOCUMENTS 55-104652 8/1980 Japan ................................ 502/328
60-238146 11/1985 Japan .

Primary Examiner—W. J. Shine
Attorney, Agent, or Firm—Leydig, Voit & Mayer

[57] ABSTRACT

A high performance catalyst for combustion having a cheap and heat-resistant carrier capable of retaining a high specific surface area even when it is used at a high temperature of 1,000° C. or higher for a long time, and a process for producing the same are provided, which catalyst comprising a compound expressed by a composition formula of $BaAl_{12}O_{19}$, and said process comprises kneading γ-alumina or aluminum hydroxide and a barium compound or impregnating the former compound with the latter so as to give an atomic ratio of Al/Ba in the range of 100/1 to 100/15, followed by calcination.

6 Claims, 3 Drawing Figures

CATALYST FOR COMBUSTION AND PROCESS FOR PRODUCING SAME

BACKGROUND OF THE INVENTION

1. Field of the Invention

This invention relates to a catalyst for combustion and a process for producing the same. Particularly it relates to a catalyst carrier which hardly causes a reduction in activity and retains a high specific surface area at high temperatures, and a process for producing the same.

2. Description of the Prior Art

In recent years, research and development of making combustors highly efficient and compact by applying the so-called catalytic combustion principle wherein combustion is promoted using a catalyst, to various combustors such as gas turbine, have been actively advanced in various fields. Usually it is necessary for the catalyst used in such combustors that its activity does not diminish at high temperatures of 1,000° C. or higher.

Further, in various petrochemistry-related industries, too, there is a tendency to use such catalysts at higher temperatures for yield improvement or for producing new products; hence improvement in the heat resistance of the catalyst has been a serious problem for its development.

The factors governing the heat resistance of catalysts vary depending on the catalyst, but in the case of a catalyst having an active ingredient supported on a carrier, the heat stabilities of the carrier and the active ingredient govern the heat resistance. Particularly in the case of a catalyst used at temperatures exceeding 1,000° C., it is indispensable for enhancing the heat resistance that the carrier hardly sinters and can retain a high specific surface area at high temperatures. Thus, various inventions directed to oxides which are stable at high temperatures, that is, carriers having a high melting point and a specific surface area have been made. For example, stabilized zirconia ($ZrO_2$), composite oxides such as mullite ($2Al_2O_3.3SiO_2$), spinel ($MgAl_2O_4$), La-containing $\beta$-$Al_2O_3$, etc. have been studied (Japanese patent application Ser. No. Sho 59-92866/1984).

However, it is the present state of the art that any of these carriers are difficult to regard as having those characteristics necessary to obtain a high performance catalyst. For example, zirconia, mullite, etc. have a tendency that when they are kept at high temperatures of 1,000° C. or higher for a long time, their specific surface areas lower gradually. La-containing $\beta$-$Al_2O_3$ has superior properties of retaining a high specific surface area at high temperatures, but lanthanum compounds are expensive as raw materials, and moreover there is a problem that unless it is prepared from an aqueous solution of a lanthanum salt and an aluminum salt according to a complicated coprecipitation method, its characteristic cannot be fully exhibited.

SUMMARY OF THE INVENTION

The object of the present invention is to provide a high performance catalyst for combustion having overcome the above-mentioned drawbacks of the prior art and having a cheap and heat-resistant carrier capable of retaining a high specific surface area even when it is used at high temperatures of 1,000° C. or higher for a long time, and a process for producing the same.

In order to achieve the above object, the present inventors have made extensive research on a heat-resistant catalyst carrier based on aluminum compounds, and as a result have found that a carrier obtained by converting a portion or the total of alumina into a compound expressed by a composition formula of $BaAl_{12}O_{19}$ causes no change in physical properties even at high temperatures such as 1,200° C. or higher and retains a high specific surface area.

In short, the present invention resides in a heat-resistant catalyst comprising a compound expressed by a composition formula of $BaAl_{12}O_{19}$ according to a structural analysis through X-ray diffraction or the like. The catalyst of the present invention has no particular limitation to the raw materials used in its preparation, and those may be sufficient which are identified to have $BaAl_{12}O_{19}$ formed therein according to a structural analysis such as X-ray diffraction. In other words, those which contain a compound of $BaAl_{12}O_{19}$ under conditions in which the carrier and catalyst are used fall within the scope of the present invention. Further, even when $BaAl_{12}O_{19}$ functions not only as carrier but also as catalyst, this, of course, falls within the scope of the present invention.

DETAILED DESCRIPTION OF PREFERRED EMBODIMENTS

The heat-resistant catalyst of the present invention is produced by adding a barium compound such as barium nitrate, barium hydroxide, barium acetate, etc. to $\gamma$-alumina or an aluminum compound which is converted into $\gamma$-alumina by calcination, according to an impregnation method or a kneading method, followed by drying and calcining. Typically, the catalyst of the present invention is produced by adding a water-soluble barium salt and water to $\gamma$-alumina or aluminum hydroxide, followed by kneading the mixture, or by impregnating a molded product of $\gamma$-alumina with a solution of a water-soluble barium salt dissolved in water, followed by drying and calcining. As the barium salt, barium nitrate ($Ba(NO_3)_2$), barium acetate ($Ba(CH_3COO)_2$), barium hydroxide ($Ba(OH)_2.8H_2O$), etc. may be used. Further, the quantity of the barium compound added is preferred to be chosen so that the atomic ratio of Al/Ba may be in the range of 100/1 to 100/15, and as to the calcination, by carrying out calcination of 1,000° C. or higher, preferably at 1,200° C. or higher, it is possible to reduce change in physical properties at high temperatures.

The present invention will be described in more detail by way of examples.

EXAMPLES 1-5

Barium acetate ($Ba(CH_3COO)_2$) was mixed with $\gamma$-$Al_2O_3$ powder having an average diameter of $3\mu$ so as to give a ratio of Al/Ba of 100/1, 100/3, 100/5, 100/10 or 100/15, followed by adding water (30 ml), kneading the mixture with a mortar, drying the resulting paste at 180° C., thereafter, grinding the dried material to a size of 60 mesh or less, molding it into a cylindrical product of 5 mm$\phi \times$5 mmL by means of a press, placing the molded product in a platinum crucible and calcining it 1,200° C. for 2 hours.

COMPARATIVE EXAMPLE 1

Without adding barium acetate, $\gamma$-$Al_2O_3$ powder, alone was molded and calcined in the same manner as in Examples 1~5.

COMPARATIVE EXAMPLE 2

Using lanthanum nitrate ($La(NO_3)_3.6H_2O$) in place of barium acetate, a carrier was prepared in the same manner as in Example 3.

Figure 1:
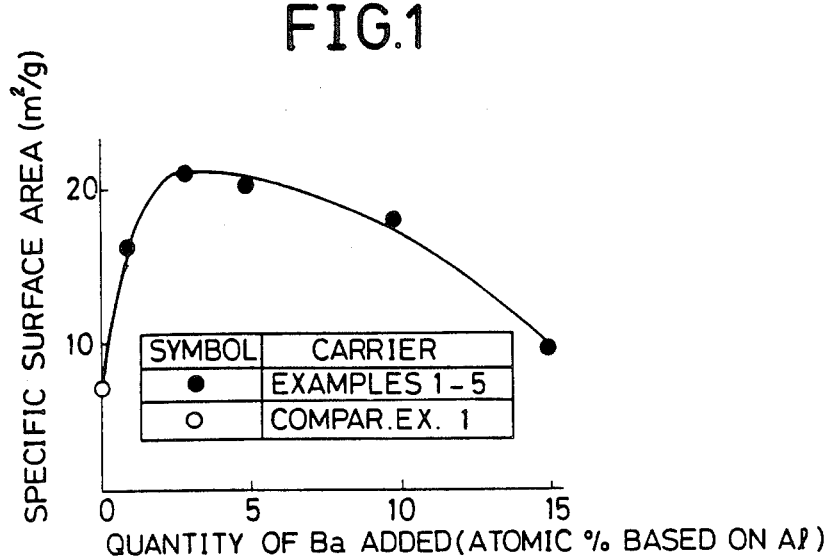
FIG. 1 shows a graph illustrating the specific surface area relative to the quantity of Ba added, of the catalyst carrier used in examples of the present invention.

Results obtained by examining the respective specific surface areas of the carriers prepared in Examples 1~5 and Comparative example 1 are shown in FIG. 1. It is seen from this figure that by adding Ba, it is possible to retain a high specific surface area even after calcination at 1200° C., and as to the quantity of Ba added, its effectiveness is notable in the range of an atomic ratio of Al/Ba of 100/3~100/10.

Figure 2:
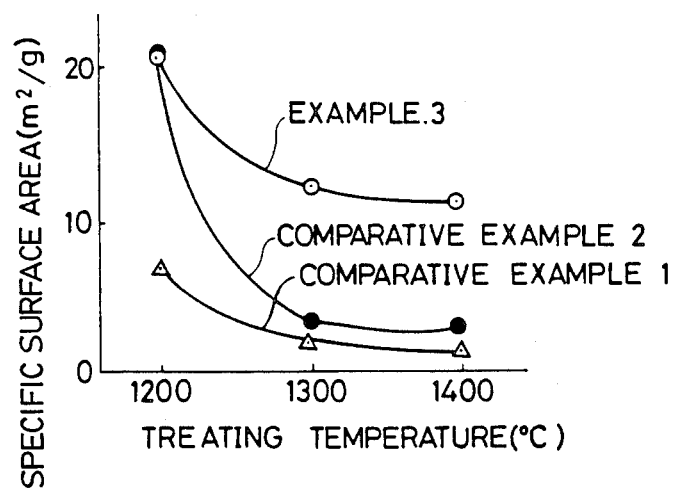
FIG. 2 shows graphs illustrating a comparison of the specific surface area of the catalyst carrier after high temperature treatment of Example 3 with those of Comparative examples.
Figure 3:
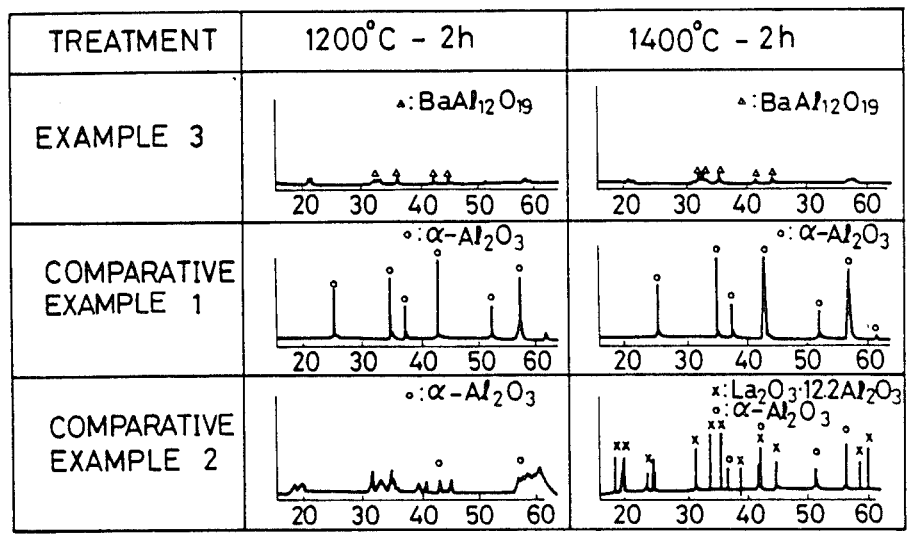
FIG. 3 shows X-ray diffraction patterns of the catalyst carriers of Example 3 and Comparative examples.

Further, FIG. 2 shows changes in the respective specific surface areas of the carriers of Example 3 and Comparative examples 1 and 2, further subjected to heat treatment at 1200° C., 1300° C. or 1400° C. for 2 hours. As shown in this figure, the carrier of the present invention is a superior one which can retain the specific surface area of 10 m$^2$/g or more up to 1400° C., as compared with the carriers of Comparative examples. FIG. 3 shows X-ray diffraction patterns of these carriers, and in the case of the Ba-added carrier of the present invention, only a broad peak of $BaAl_{12}O_{19}$ is observed; thus it was found that the main component of the carrier was of fine $BaAl_{12}O_{19}$ as compound. Further, in the case of the carrier of the present invention, even after it is heat-treated at 1400° C., the peaks of $BaAl_{12}O_{19}$ do not become sharp and hence the carrier is judged to have a fine particle diameter, whereas in the case of Comparative example 1, when heat treatment is carried out at a temperature of 1200° C. or higher, and in the case of Comparative example 2, when heat treatment is carried out at 1,400° C., sharp peaks of $\alpha$-$Al_2O_3$ or $La_2O_3.11Al_2O_3$ are observed; thus it is seen that in both the cases, sintering occurs and particles grow at high temperatures. From the above results, it is certain that the reason that the carrier of the present invention is stable at high temperatures is due to the presence of a compound of $BaAl_{12}O_{19}$ having a superior heat stability; this evidences the validity of the present invention.

EXAMPLES 6-10 AND COMPARATIVE EXAMPLES 3 AND 4

The respective carriers of Examples 1~5 and Comparative examples 1 and 2 (each 30 g) were impregnated with an aqueous solution of palladium nitrate (Pd concentration: 13 mg/ml) (12 ml), followed by drying at 180° C. and calcining at 1,200° C. to obtain catalysts. Further, in order to evaluate the heat resistance of the thus obtained catalysts, they were subjected to heat treatment in air at 1,200° C. for 200 hours or at 1,400° C. for 2 hours.

These catalysts (each 10 ml) were respectively placed in a quartz reaction tube (20 ml) and subjected to measurement of the combustion activity of propane under the following conditions:

Test conditions (1) SV: 30,000 h$^{-1}$
(2) Gas composition: $O_2$, 8%; $C_3H_{18}$, 1.2%; and $N_2$, the balance.
(3) Gas preheating temperature: 300° C.

The results are collectively shown in Table 1. Any of the catalysts of the present invention exhibited a higher combustion activity than those of Comparative examples 3 and 4, and particularly in the case of the carriers of Examples 7 to 9 having an atomic ratio of Al/Ba of 100/3 to 100/10, a high activity was obtained. This corresponds well to the specific surface areas of carriers shown in FIG. 1; thus it can be seen that the carrier and catalyst of the present invention are superior. Further, it can be seen that the catalysts of Examples 8 to 10 show extremely small reductions in the activity due to heat treatment at 1,200° C. for 200 hours or at 1,400° C. for 2 hours, as compared with the catalysts of Comparative Example 4; thus it can be seen that the catalysts of the present invention are superior as a heat-resistant catalyst for combustion.

TABLE 1

| Catalyst | Percentage combustion of LPG (%) | | |
| --- | --- | --- | --- |
| | Initial period | After heat-treatment of 1,200° C.-200 h | After heat treatment of 1,400° C.-2 h |
| Example 6 | 64 | 32 | 18 |
| Example 7 | 99 or more | 96 | 83 |
| Example 8 | 99 or more | 99 or more | 99 or more |
| Example 9 | 99 or more | 99 or more | 99 or more |
| Example 10 | 82 | 80 | 81 |
| Compar. ex. 3 | 13 | 12 | 13 |
| Compar. ex. 4 | 99 or more | 90 | 24 |

The catalyst carrier of the present invention can retain a high specific surface area of e.g. 20 m$^2$/g or more after heat treatment at 1,200° C. and 10 m$^2$/g or more even after heat treatment at 1,400° C., and also can improve the activity of catalysts used at high temperatures to a large extent. Further, even when the catalyst having Pd supported on the present carrier is exposed to a temperature of 1,200° C. or higher, the combustion activity hardly diminishes to make a high load catalyst combustion possible. Still further, cheap $\gamma$-$Al_2O_3$ and barium compounds can be used as raw materials, and also conventional kneading process or impregnation process can be employed for the preparation; hence it is possible to reduce the production cost of the carrier.

What we claim is:

1. A catalyst for combustion comprising a compound expressed by a composition formula $BaAl_{12}O_{19}$ having Pd supported thereon.

2. A process for producing a catalyst for combustion which comprises kneading (a) at least one of $\gamma$-alumina and aluminum hydroxide and (b) an aqueous solution of a barium compound or impregnating (a) with (b) so as to give an atomic ratio of Al/Ba in the range of 100/1 to 100/15, followed by drying, calcining and treating the resulting mixture with palladium.

3. A process according to claim 2 wherein said barium compound is at least one compound selected from the group consisting of barium nitrate, barium acetate and barium hydroxide.

4. A process according to claim 2 wherein said atomic ratio of Al/Ba is in the range of 100/3 to 100/10.

5. A process according to claim 2 wherein said calcination is carried out at 1,000° C. or higher.

6. A process according to claim 2 wherein said barium compound is a water soluble compound.

* * * * *